I. W. PECK.
FRUIT CLEANER AND GRADER.
APPLICATION FILED NOV. 23, 1909.
975,452.
Patented Nov. 15, 1910.
3 SHEETS—SHEET 1.
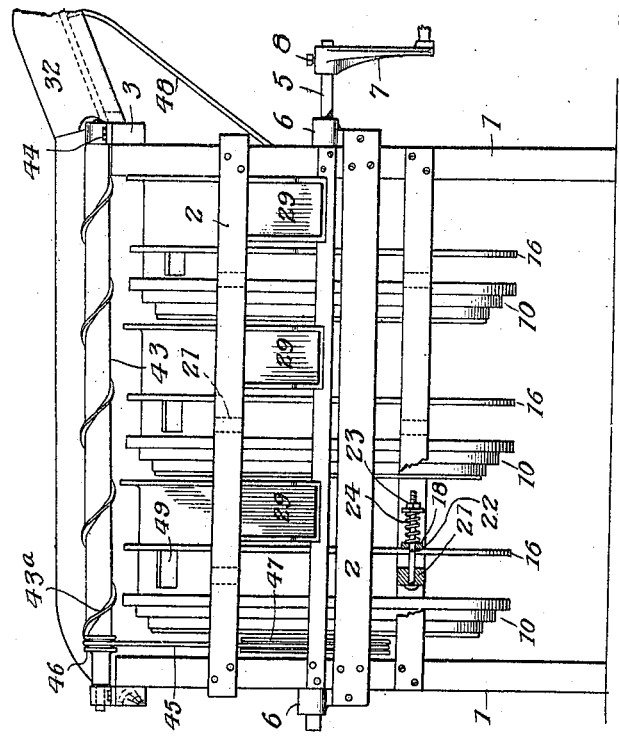
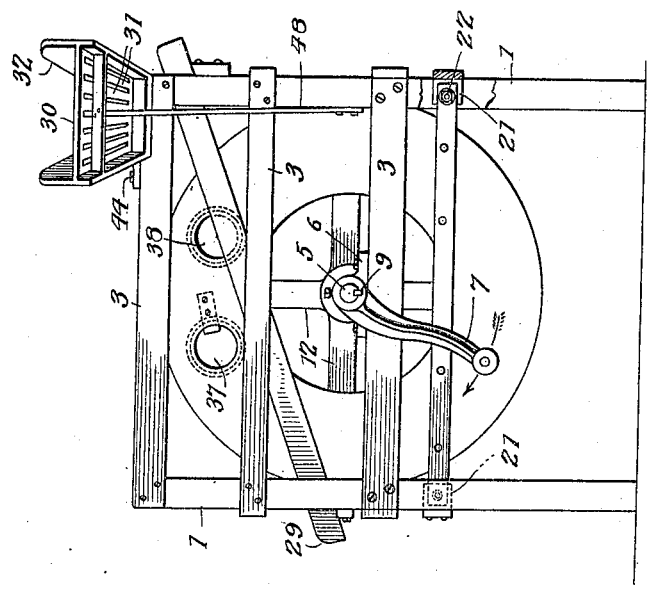
WITNESSES
INVENTOR
IRVING W. PECK,
BY
ATTORNEYS

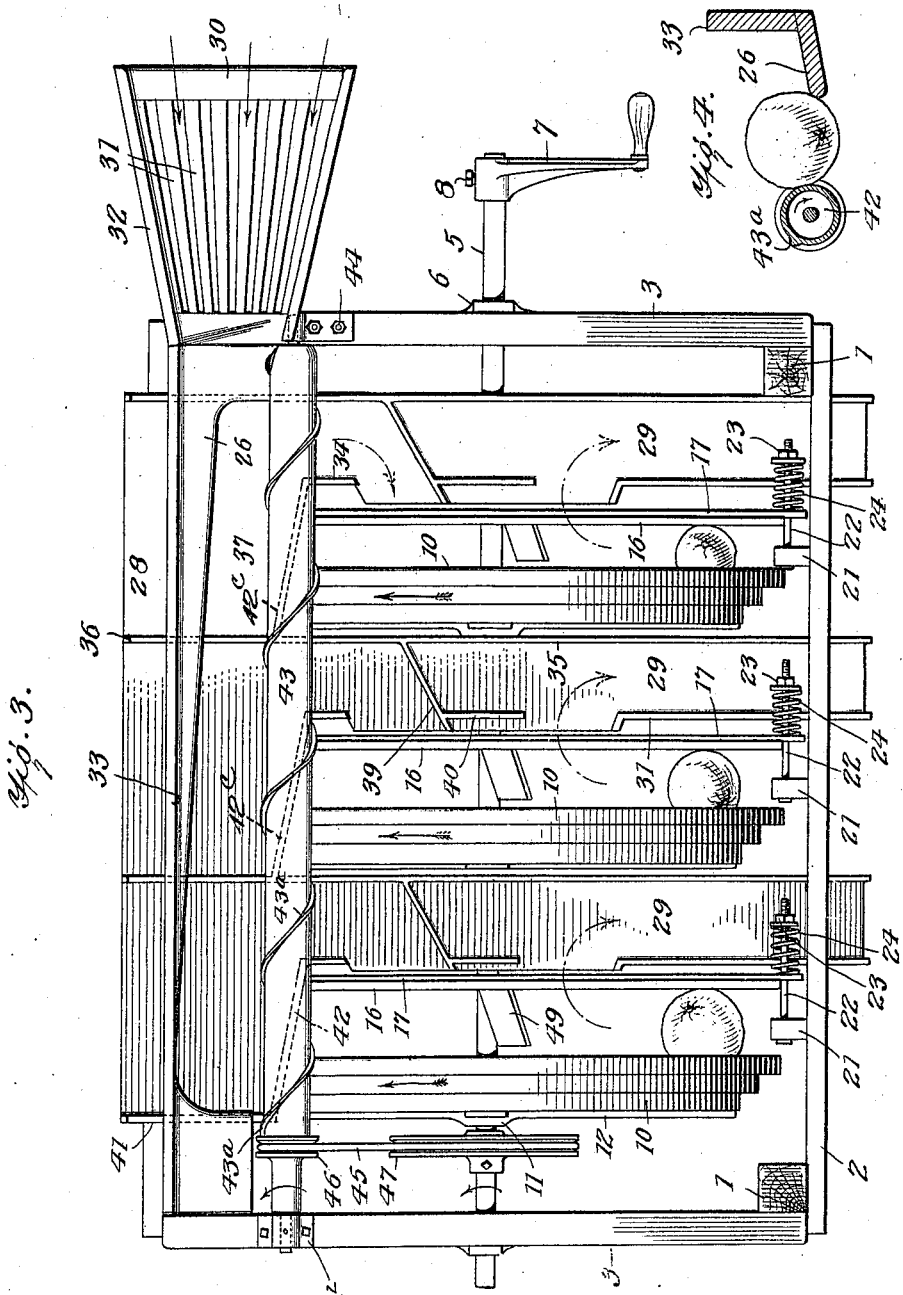

I. W. PECK.
FRUIT CLEANER AND GRADER.
APPLICATION FILED NOV. 23, 1909.

975,452.

Patented Nov. 15, 1910.
3 SHEETS—SHEET 3.

WITNESSES
L. H. Schmidt
O. E. Tranor

INVENTOR
IRVING W. PECK,
BY Munn & Co.
ATTORNEYS

UNITED STATES PATENT OFFICE.

IRVING W. PECK, OF BRADENTOWN, FLORIDA.

FRUIT CLEANER AND GRADER.

975,452.

Specification of Letters Patent. Patented Nov. 15, 1910.

Application filed November 23, 1909. Serial No. 529,520.

*To all whom it may concern:*

Be it known that I, IRVING W. PECK, a citizen of the United States, and resident of Bradentown, in the county of Manatee and State of Florida, have invented certain new and useful Improvements in Fruit Cleaners and Graders, of which the following is a specification.

My invention is an improvement in fruit cleaners and graders, and consists in certain novel constructions, and combinations of parts, hereinafter described and claimed.

The object of the invention is to provide a device of the character specified that will grade or sort the fruit into classes, according to size, and will afterward clean the assorted grades, each grade being cleaned by a device adapted especially for that size.

Figure 5:
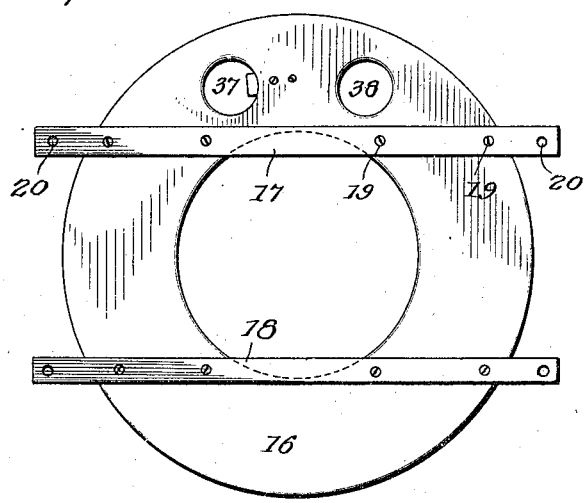
Figure 6:
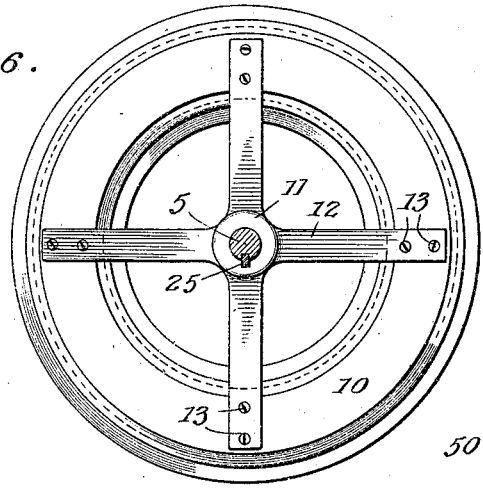
Figure 7:
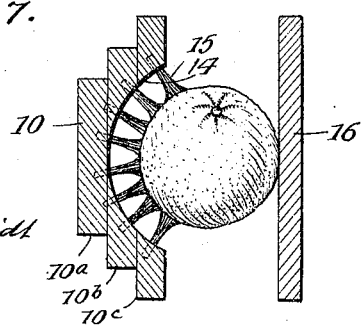
Figure 8:
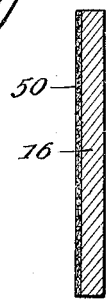

Referring to the drawings forming a part hereof, Figure 1 is an end view of the machine, Fig. 2 is a side view, Fig. 3 is a plan view, Fig. 4 is a section through the feed trough, Fig. 5 is a detail front view of the support for the fruit, Fig. 6 is a similar view of the brush wheel, Fig. 7 is a transverse section through the support and the brush, and Fig. 8 is a transverse section through a modified form of support.

In order to successfully market fruit such as oranges, and grape fruits, it is necessary to wash them, in order to get rid of the "sooty mold" or "smut" deposited thereon by the white fly. This "smut" adheres closely, being deposited in the pores of the skin, and to remove it thoroughly, a brush and water should be used. In a machine using brushes, the brushes are necessarily spaced for one size of fruit, and when a larger size passes, the fruit is liable to be injured by the pressure, while a smaller size will not be thoroughly cleaned. The present embodiment of the invention overcomes these several difficulties, by first grading the fruit according to size and then cleaning the several sizes in a machine suited to that size.

The improved machine comprises a frame composed of uprights 1, longitudinal bars 2, connecting the uprights, and cross bars 3 also connecting the uprights at the ends. A shaft 5 is journaled longitudinally of the frame at its approximate center, in bearings 6 on the cross bars, and one of the ends of the shaft is extended outside of the frame, and provided with a crank 7, secured to the shaft by a set screw 8, and by a key 9. A plurality of wheels are secured to the shaft at spaced intervals, each wheel consisting of a ring rim 10, (Fig. 6) a hub 11, and spokes 12, which radiate from the hub, and are connected to the ring by screws 13. The rim as shown more especially in Fig. 7 is provided on the opposite side from the spokes, with an annular groove 14 in its face, and the groove is thickly set with bristles, 15. In the drawings, the rim is shown as built up from three rings $10^a$, $10^b$ and $10^c$, arranged side by side, and increasing in diameter, and the rings $10^b$ and $10^c$ are cut away to form the groove. It is obvious that it might be constructed in many different manners, however, and that other cleansing media might be used instead of bristles.

The fruit is supported during the operation of the brush by a ring 16, (Fig. 3) and the ring support is provided with two cross bars 17 and 18 secured thereto by screws 19 and extending beyond the ring on each side, and each end of each cross bar is provided with an opening 20. The longitudinal bars 2 above and below the vertical center of the frame are provided with lugs 21 adjacent to each brush, and a bolt 22 is passed through each lug, and through the opening 20 in the end of the adjacent cross bar 17 or 18 on the support. The free end of the bolt is threaded, and provided with a nut 23, and a coil spring 24 encircles the bolt between the cross bar and the nut.

It will be evident from the description, that the support is pressed toward the brush by the springs, and that the said support may yield if necessary. When the shaft is rotated, the brushes are turned, being keyed to the shaft as at 25, and the fruit is rolled on the support and revolved around the shaft, all sides of the fruit being brought into contact with the brushes.

A feed trough 26 is arranged longitudinally of the frame near one side thereof, and the bottom of the trough intermediate its ends is cut away as at 37, to permit the passage of the fruit. A plate or table 28 is arranged below the trough, and the plate is provided on its inner edge, with a plurality of lateral extensions 29, one for each brush, the said extensions extending across the face of the support 16, as shown in Fig. 3, and outside of the frame on the opposite side from the feed trough. At its entrance end the trough 26 is provided with a hopper mouth 30, having a slatted bottom 31, and marginal flanges 32, and the trough is provided with an outer marginal flange 33. Each of the extensions 29 is provided on its side edges with marginal flanges 34 and 35, and the flange 35 is extended across the plate 28 as at 36.

Each of the supports 16 is provided near its top with two circular openings 37 and 38, the opening 38 for the entrance of the fruit, and the opening 37 for its exit, and the openings are spaced apart slightly from each other as shown. Each of the extensions 29 is provided with a transverse deflecting rib 39, which extends and ends adjacent to the outer side of the opening 37, and with a lateral extension 40 which extends across the space between the openings, and ends at the inner edge of the opening 38.

The end of the plate 28 remote from the entrance end of the feed trough is provided with a transverse rib 41, and an inclined rib 42 connects the rib 41 with the adjacent flange 34 of the extension, while similarly inclined ribs 42c connect the extensions 36 with the flange 34 of the adjacent extensions. It will be observed that the flange 34 of each extension is cut away from the inner edge of the opening 37 to the outer edge of the opening 38.

A feed roller 43 is journaled in bearings 44, on the frame, adjacent to the inner edge of the feed trough, and the periphery of the roller is provided with a spiral vane 43ª and is driven from the shaft 5 by a belt 45, passing over pulleys 46, and 47 on the roller and shaft respectively.

It will be observed from an inspection of Fig. 3 that the line upon which the bottom of the trough is cut away is inclined, the width of the cut away portion increasing from the entrance end of the trough toward the opposite end. The distance between the ribs 36, is considerably greater than the width of the lateral extensions 29, so that several sizes of fruit may pass into each extension.

It will be evident from an inspection of Fig. 1 that plate 28 and its extensions are inclined downwardly toward the outer ends of the extensions, and as shown in Fig. 2, the feed trough 28 is inclined downwardly from the entrance end. The said end is also supported by a brace 48. On the brush side of each support, a deflecting plate 49 is secured thereto, the said plate being at the inner edge of the opening 38, and being inclined away from the said opening toward its free end and acting to deflect the fruit through the opening 38 to the opposite side of the wheel.

In the use of the machine, the supports are adjusted toward or from the brushes by means of the nuts 23, until the proper distance is attained for the fruit to be cleaned. Each of the brushes and its support composes a cleaning device, and as many of these devices as may be desired may be mounted on the shaft. When the supports are properly adjusted, the fruit is fed into the hopper mouth and passes down the trough. The smaller fruit passes through the cut away portion of the bottom, while the larger rolls on until the opening is of sufficient width to permit its passage. As the fruit falls on the plate 28 it passes under the roller 43, and moves along the ribs 42 to the entrance of the extensions 29. The individual fruits pass down the extensions until they meet the ribs 39 which are inclined as shown, when they are deflected laterally and pass one by one through the opening 38. As they pass through the said opening, they are engaged by the brush and are revolved around the shaft, being rotated in all directions during their passage, and thoroughly cleaned by the bristles. As each fruit engages the plate 49, it is deflected and passed through the opening 38 to the other side of the support, and again onto the extension, but below the rib 39. The fruit then passes down the extensions, and into a suitable receptacle. The operation of all of the cleaning devices is the same, and during the travel of the fruit every part of it is subjected to the action of the brushes.

If desired, the operative face of the support may be provided with a layer 50 of felt or other similar material, the said layer assisting in the cleaning operation, and also increasing the friction between the fruit and the support.

I claim:

1. A machine of the class described, comprising a supporting frame, a shaft journaled thereon, a plurality of wheels secured to the shaft in spaced relation, each of said wheels having upon one face an annular groove, provided with bristles, a ring support opposite each of said grooves, means for mounting said support to yield toward and from the corresponding wheel, each of said supports having near its top a plurality of transverse openings spaced apart from each other, a deflecting plate between the openings on the side adjacent to the wheel, a feed trough parallel with the shaft and having in its bottom toward the shaft a cut away portion forming a passage, said passage gradually increasing in width from the entrance end of the trough, a plate below the trough and provided with a lateral extension for each support and extending alongside the opposite face of the wheel from the groove, said plate and extension having flanged edges, and being inclined downwardly from the trough and transversely with respect to the frame, a deflecting rib on each extension between the openings, a roller provided with a spiral vane journaled on the frame, at the inner edge of the feed trough, means for rotating the shaft, and a driving connection between the roller and the shaft.

2. A machine of the class described, comprising a frame, a shaft journaled thereon, a plurality of wheels secured to the shaft in spaced relation, each of said wheels having upon one face an annular groove concentric with the wheel and said groove provided on its bottom with a brush, a ring opposite each groove and mounted for yielding movement with respect thereto, means for adjusting the ring toward the groove, a deflecting plate on the face of the support adjacent to the wheel for deflecting the articles to be cleaned from the groove, means for grading the articles according to size, and means for receiving the articles from said means, and conducting them to the respective cleaning devices.

3. In a machine of the class described, means for grading the articles according to size, a plurality of cleaning devices, each comprising a rotatable wheel having in one face an annular groove provided with cleaning means concentric with the wheel means for holding the article in the groove, said means being yieldingly mounted, means whereby said holding means may be adjusted toward or from the groove, and means for receiving the articles from the grading means and conducting them to the respective cleaning devices.

4. In a machine of the class described, a cleaning device, comprising a rotatable wheel having in one face an annular groove concentric with the wheel and provided with bristles, a support comprising a ring arranged opposite the groove, and mounted to yield toward and from the wheel, said ring having near its upper end a plurality of openings spaced apart from each other, means for delivering the articles to be cleaned through one of the openings, and a deflecting plate adjacent to the other opening, for deflecting the articles therethrough.

5. In a machine of the class described, a cleaning device, comprising a rotatable wheel having in one face an annular groove concentric with the wheel, and provided with bristles, a support comprising a ring arranged opposite the groove, and mounted to yield toward and from the wheel, said ring having near its upper end a plurality of openings spaced apart from each other, means for supplying the articles to be cleaned through one of the openings, and means for deflecting them through the other opening after cleaning.

6. In a machine of the class described, a cleaning device, comprising a rotatable wheel having in one face an annular groove concentric with the wheel and provided with bristles, a support comprising a ring arranged opposite the groove and mounted to yield toward and from the wheel, said ring having near its upper end a plurality of openings spaced apart from each other, for the purpose specified.

7. In a machine of the class described, a cleaning device comprising a rotatable wheel having in one face an annular groove concentric with the wheel and provided with bristles, a support comprising a ring arranged opposite the groove and mounted to yield toward and from the wheel, means for delivering the articles to be cleaned into the groove, and means for deflecting them therefrom.

8. In a machine of the class described, a cleaning device comprising a rotatable wheel having in one face an annular groove concentric with the wheel and provided with bristles, and a support comprising a ring arranged opposite the groove and mounted to yield toward and from the wheel.

9. In a device of the class described, a cleaning device comprising a rotatable wheel having in one face an annular groove concentric with the wheel and provided with bristles, and a yieldingly mounted stationary ring opposite the groove.

10. In a device of the class described, a cleaning device comprising a rotatable wheel having in one face an annular groove concentric with the wheel and provided with bristles, and means for holding the articles in the groove during the rotation of the wheel.

11. In a machine of the class described, a cleaning device comprising a ring mounted for rotation and provided in one face with a groove, the bottom of the groove being provided with a brush, a ring support arranged opposite the groove, cross bars connected with the ring support, fixed bolts extending through the ends of the bars, nuts on the bolts and springs between the bars and the nuts.

12. In a machine of the class described, a cleaning device comprising a ring mounted for rotation and provided in one face with a groove, the bottom of the groove being provided with a brush, a ring support arranged opposite the groove, means for mounting the ring support to yield toward and from the groove, and means in connection with said mounting for adjusting the ring toward and from the brush.

13. In a machine of the class described, a cleaning device comprising a ring mounted for rotation and provided in one face with a groove, the bottom of the groove being provided with a brush a ring support arranged opposite the groove, and means for adjusting the support toward and from the groove.

IRVING W. PECK.

Witnesses:
T. A. MITCHELL,
M. B. ALDERMAN.